United States Patent [19]
Morgan

[11] Patent Number: 4,714,640
[45] Date of Patent: Dec. 22, 1987

[54] (ALUMINA ELECTRICALLY CONDUCTIVE) GUIDE ARTICLE

[75] Inventor: Charles G. Morgan, Laurens, S.C.
[73] Assignee: General Electric Co., N.Y.
[21] Appl. No.: 826,165
[22] Filed: Feb. 4, 1986
[51] Int. Cl.$^4$ ............................................. C04B 35/10
[52] U.S. Cl. ...................................... 428/36; 252/519; 252/520; 501/127; 501/134; 501/153
[58] Field of Search ............... 501/134, 127, 135, 153; 252/519, 520; 428/36

[56]  References Cited
U.S. PATENT DOCUMENTS 3,776,744  12/1973  Clendenen ................... 501/134 OR
3,918,982  11/1975  Hart et al. ..................... 501/134 OR
3,937,670  2/1976   Semkima et al. ............... 501/127 X

FOREIGN PATENT DOCUMENTS 0208969  4/1984  Fed. Rep. of Germany ...... 501/153
0176966  9/1985  Japan .................................. 501/153
0512197  6/1976  U.S.S.R. .

OTHER PUBLICATIONS

Bhattacharyya et al, "Aluminum Titanate", Glass and Ceramic Research Institute, 32, India, vol. 10, No. 4 (1963).

Primary Examiner—Mark L. Bell
Assistant Examiner—Karl Group
Attorney, Agent, or Firm—Stanley C. Corwin; Birgit E. Morris

[57]  ABSTRACT

An improved alumina base ceramic guide article is disclosed having sufficient electrical conductivity to remove the static electricity charge from continuously moving textile and synthetic organic polymer filament and tapes when placed in physical contact with said guide article. Specifically said guide article is formed with a sintered polycrystalline alumina ceramic material having a rounded grain size so as not the mechanically abrade the filament or tape members in physical contact therewith and with said ceramic material comprising in approximate weight percent based on the starting batch formulation at least 94% $Al_2O_3$, 1–4.5% $TiO_2$, 0–4% $MnO_2$, and 0–3% $Fe_2O_3$. In the preferred embodiments, the ceramic material contains sufficient $TiO_2$, $Fe_2O_3$, and $MnO_2$ content to produce a dark uniform color in the final ceramic article.

3 Claims, 2 Drawing Figures

(ALUMINA ELECTRICALLY CONDUCTIVE) GUIDE ARTICLE

BACKGROUND OF THE INVENTION

Alumina based ceramics have long been used for a great variety of end product applications including kitchen and bathroom fixtures, dielectric insulators, electronic packages and substrates, wear nozzles, tool sharpeners, and textile guides. Various oxides have also been combined with the alumina material to modify the physical properties of the final sintered ceramic as well as its method of preparation. For example, a composite alumina ($Al_2O_3$) and titania ($TiO_2$) ceramic is reported in the technical article "Aluminium Titanate", Central Glass and Ceramic Research Institute, Calcutta—32, India, Vol. 10, No. 4 (1963) along with is physical and dielectric properties. A different alumina and titania ceramic is also reported in U.S.S.R. Pat. No. 512,197 (June 1976) and which is said to have increased heat resistance and mechanical strength. In the U.S. Pat. No. 3,776,744 there is also disclosed an alumina ceramic which further contains at least 5% by weight of at least one transition metal and with the preferred transition metals being iron, chromium and titanium.

Electrically conductive ceramic guide articles are also known and generally comprise a titanium dioxide base ceramic composition wherein at least a portion of the titanium dioxide content has been reduced by heating in a reducing atmosphere to produce a dark uniform color in the final ceramic article. As the production speeds for man-made as well as natural textile fibers have increased, however, the wear resistance of said titanium dioxide base ceramic guides has not kept pace. While more wear-resistant alumina based ceramic guides are also known, this ceramic material has also been found inadequate by reason of: (1) having sharp angular alumina grains which abrade fibers too readily, and (2) being essentially an electrical insulator. Accordingly, it would be desirable to overcome both of said disadvantages for the alumina base ceramic guides in order to meet current production needs in textile manufacture as well as meet current operating speeds in related end product applications.

SUMMARY OF THE INVENTION

It has now been discovered that a polycrystalline alumina ceramic material can be prepared in a particular manner having fine size rounded grains so as to demonstrate superior surface smoothness when employed as a ceramic guide article along with sufficient electrical conductivity so as to remove the static electrical charge when continuously moving textile and synthetic organic polymer filaments and tape are placed in physical contact therewith. Said improved alumina ceramic also exhibits a uniformly dark color so that filament materials being transported via the guide articles can be visually inspected during processing. The material composition providing said improvement comprises a sintered polycrystalline alumina ceramic having a rounded grain size not to exceed about 4.0 microns average diameter together with electrical resistivity not to exceed about $1 \times 10^8$ ohm centimeters, said ceramic material comprising in approximate weight percent based on the starting batch formulation at least 94% $Al_2O_3$, 1-4.5% $TiO_2$, 0-4% $MnO_2$, and 0-3% $Fe_2O_3$. While the exact phase structure of said improved ceramic material has not yet been fully investigated, it has been observed that the major phase comprises grains of alumina sintered together which contain a secondary phase being disposed at the boundaries of said alumina grains and with the composite material exhibiting few void spaces therebetween.

In certain preferred embodiments, the improved ceramic guide article has the shape of a cylinder or eyelet which includes a central opening through which filmentary material is transported. In other preferred tape guide embodiments, the guide article can be formed as a cylindrical disc having an aperture for mounting purposes. The $TiO_2$, $Fe_2O_3$ and $MnO_2$ content is maintained at levels in the preferred ceramic composition sufficient to produce the desired dark uniform color. In said regard, the $TiO_2$ content is maintained at 1% or greater to avoid mottled coloration in the final sintered article. The method of preparing said alumina base electrically conductive ceramic guide article demonstrating all of the foregoing specified physical and electrical characteristics comprises:

(a) forming the desired guide article shape with a mixture comprising in approximate weight percent based on the starting batch formulation at least 94% $Al_2O_3$, 1-4.5% $TiO_2$, 0-4% $MnO_2$ and, 0-3% $Fe_2O_3$, (b) sintering said guide article shape in an oxidizing atmosphere until the desired density has been achieved and, (c) firing the sintered guide article shape at elevated temperatures in a reducing atmosphere until a dark uniform color is produced in said sintered ceramic material. In said above preparation method, the sintering step can be carried out in air at elevated temperatures in the approximate range 1400°–1500° C. while the refiring step which reduces $TiO_2$, $Fe_2O_3$ and $MnO_2$ in the already sintered ceramic for coloration can be carried out in hydrogen at about the same temperature range. Conventional ceramic processing techniques can be employed to initially form the shaped guide article such as dry pressing, extrusion and injection molding. The electrical resistivity exhibited by said ceramic material when prepared in the foregoing manner can be as low as 300,000 ohm centimeters.

DESCRIPTION OF THE PREFERRED EMBODIMENTS

Figure 1:
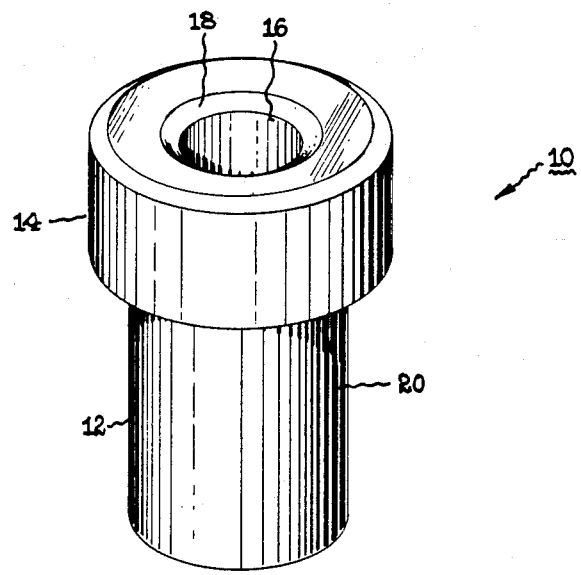
FIG. 1 depicts in perspective view an eyelet type textile guide formed with the improved ceramic material of the present invention.

In FIG. 1 there is depicted a straight shouldered eyelet guide 10 comprising a hollow cylindrical body portion 12 terminating at one end in a shoulder portion 14 of larger diameter and which further includes a central opening 16 through which filamentary material is transported during textile manufacture. Central opening 16 further includes a radiused contour 18 at both ends of the guide member to resist mechanically abrading the filmentary material when placed in physical contact therewith. As can be further noted from said drawing, all surfaces 20 of said guide member are highly polished to include the surface of the central opening 18 to further reduce abrasion of the filmentary material as much as possible.

Figure 2:
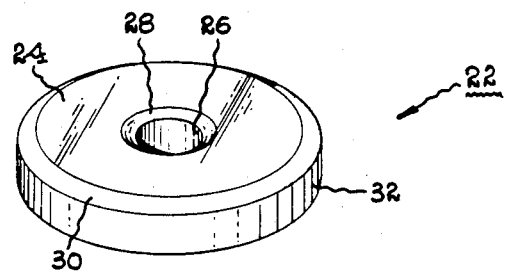
FIG. 2 also depicts in perspective view a typical tape guide member formed with the present ceramic material.

In FIG. 2 there is depicted a representative tape guide member 22 in the form of a flat disc 24 having a central mounting aperature 26 and which can be used to transport a synthetic organic polymer tape in various type equipment such as tape recorders, computers and the like. Radius curvatures 28 and 30 are again provided to remove sharp edges on said member. Similarly, all surface portions 32 of said member are given a high degree of polish as a further means of resisting abrasion to the tape.

The ghist of the present invention resides in properly preparing an alumina base electrically conducted ceramic material for the above illustrated type textile and tape guide articles. To more fully describe said ceramic material preparation, a representative example is hereinafter given along with providing electrical conductivity measurements for still other ceramic materials having similar compositions. Accordingly, a 100 gram batch of one preferred ceramic material according to the present invention was prepared by mixing approximately 94.1 grams $Al_2O_3$, 2.7 grams $TiO_2$, 1.6 grams $MnO_2$, and 1.6 grams $Fe_2O_3$ together. Said batch mixture was blended in a ball mill for approximately six hours after approximately 7 grams of a binder agent in aqueous suspension had been added to the mixture. The ball mill mixture was next screened and pressed into the shape of a typical guide article at 30,000 psi pressure before firing to produce a fully sintered product. Said sintering step was carried out in air at approximately 1450° C. The sintered article was thereafter refired in a hydrogen atmosphere at approximately the same temperature to reduce certain oxides in the ceramic composition and produce a dark uniform color therein. The electrical resistivity value measured upon said sintered article along with the average crystal size in the sintered microstructure is given in Table I below together with the same evaluation being made upon other ceramics having similar material compositions.

TABLE I

| | (Weight Percent) | | | | | |
|---|---|---|---|---|---|---|
| Examples | $Al_2O_3$ | $TiO_2$ | $MnO_2$ | $Fe_2O_3$ | Electrical Resistivity (ohm-cm) | Average Crystal Diameter (Microns) |
| 1 | 94 | 6 | — | — | $9 \times 10^9$ | 1.82 |
| 2 | 94 | — | — | 6 | $3 \times 10^9$ | 1.40 |
| 3 | 94 | — | 6 | — | $1.5 \times 10^{12}$ | 1.82 |
| 4 | 94 | 1 | 4 | 1 | $1 \times 10^8$ | 3.31 |
| 5 | 94 | 2.5 | 1 | 2.5 | $2.2 \times 10^7$ | 2.85 |
| 6 | 94 | 3 | 3 | — | $2.5 \times 10^7$ | 3.81 |
| 7 | 94 | 3 | — | 3 | $3 \times 10^5$ | 3.59 |
| 8 | 94.1 | 2.7 | 1.6 | 1.6 | $3 \times 10^6$ | 2.92 |

TABLE I-continued

| | (Weight Percent) | | | | | |
|---|---|---|---|---|---|---|
| Examples | $Al_2O_3$ | $TiO_2$ | $MnO_2$ | $Fe_2O_3$ | Electrical Resistivity (ohm-cm) | Average Crystal Diameter (Microns) |
| 9 | 94 | 4.5 | 1.5 | — | $8 \times 10^6$ | 3.59 |
| 10 | 94 | 4.5 | — | 1.5 | $1.6 \times 10^7$ | 2.62 |

It will be apparent from the foregoing measurements that only the Example 4–10 ceramics exhibited sufficient electrical conductivity to remove a static electricity charge from filamentary textile and synthetic organic polymer materials placed in physical contact therewith. Surprisingly, the larger crystal size microstructure for said Example 4–10 ceramics did not prove detrimental in providing the needed surface smoothness for guide product applications.

It will be apparent from the foregoing description that an improved ceramic guide article employing an alumina based electrically conductive ceramic has been provided along with a method for preparation of the improved article. It will be apparent to one skilled in the art, however, that minor compositional modifications can be made in this ceramic material without severely degrading the desired improvement in physical and electrical characteristics. For example, further adjustment is believed possible between the relative proportions of $TiO_2$, $Fe_2O_3$, and $MnO_2$ in said improved ceramic material other than employed in the above specific examples as a means of enhancing the desired properties for particular end product application. Accordingly, the scope of the present invention is intended to be limited only by the scope of the following claims:

I claim:

1. An alumina based electrically conductive ceramic guide article to remove the static electricity charge from continuously moving textile and synthetic organic polymer filaments and tapes when placed in physical contact with said guide article comprising a polished body of sintered polycrystalline alumina ceramic material having a central opening through which the filamentary material is transported which further includes a radiused contour at both ends of said opening, said ceramic material having a rounded grain size not to exceed about 4.0 microns average diameter together with electrical resistivity not to exceed about $1 \times 10^8$ ohm-centimeters, and said ceramic material also consisting essentially of in approximate weight percent based on the starting batch formulation at least 94% $Al_2O_3$, 1–4.5% $TiO_2$ and at least one component selected from the group consisting of $MnO_2$, $Fe_2O_3$ or mixture thereof wherein the amount of $MnO_2$ and $Fe_2O_3$ present ranges from 0–4% and 0–3%, respectively.

2. A ceramic guide article as in claim 1 wherein said body is in the shape of a hollow cylinder terminating at one end in a larger diameter shoulder.

3. A ceramic guide article as in claim 1 wherein said body is in the shape of a flat disc.

* * * * *